United States Patent
Seo

[11] Patent Number: 6,004,621
[45] Date of Patent: Dec. 21, 1999

[54] METHOD FOR PRODUCING PHOSPHOR OF HIGH BRIGHTNESS

[75] Inventor: Sang-beom Seo, Kyungsangnam-do, Rep. of Korea

[73] Assignee: Samsung Display Devices Co., Ltd., Rep. of Korea

[21] Appl. No.: 09/162,382

[22] Filed: Sep. 28, 1998

[30] Foreign Application Priority Data

Sep. 26, 1997 [KR] Rep. of Korea ............ 97-48895

[51] Int. Cl.$^6$ .................................................. B05D 7/00
[52] U.S. Cl. .................... 427/218; 427/157; 427/242; 427/314; 427/372.2; 427/384
[58] Field of Search ........................ 427/218, 314, 427/372.2, 157, 242, 384; 252/363.5

[56] References Cited

U.S. PATENT DOCUMENTS

| | | | |
|---|---|---|---|
| 3,534,911 | 10/1970 | Gwilliam | 241/16 |
| 3,549,091 | 12/1970 | Slepetys et al. | 241/5 |
| 3,604,634 | 9/1971 | Windle | 241/16 |
| 3,976,580 | 8/1976 | Kaminstein et al. | 252/2 |
| 4,274,599 | 6/1981 | Manfroy et al. | 241/15 |
| 4,525,197 | 6/1985 | Eibner et al. | 71/11 |
| 4,537,735 | 8/1985 | Enomoto et al. | 264/63 |
| 5,033,682 | 7/1991 | Braun | 241/16 |
| 5,308,809 | 5/1994 | Baumard et al. | 501/152 |
| 5,827,797 | 10/1998 | Cass et al. | 505/430 |

OTHER PUBLICATIONS

"Treatise on Materials Science and Technology, vol. 9: Ceramic Fabrication Processes," Wang, ed. Academic Press, New York, 1976 (No Month).

*Primary Examiner*—Shrive Beck
*Assistant Examiner*—Paul D. Strain
*Attorney, Agent, or Firm*—Christie, Parker & Hale, LLP

[57] ABSTRACT

A method of producing a phosphor having high brightness is provided, and the method includes the steps of firing raw materials of phosphor, washing the resulting fired material, ball-milling the washed material with one or more dispersion agents, coating the ball-milled material with pigment, and drying the coated material. The dispersion agent is preferably a compound selected from the group consisting of silicate compounds, sodium polycarbonate, and alcohols.

4 Claims, 1 Drawing Sheet

METHOD FOR PRODUCING PHOSPHOR OF HIGH BRIGHTNESS

CROSS REFERENCE TO RELATED APPLICATION

This application claims priority to Korean patent application No. 97-48895, filed Sep. 26, 1997, the content of which is incorporated hereinto by reference.

FIELD OF THE INVENTION

The present invention relates to a method of producing phosphor, more particularly, to a method of producing phosphor of high brightness.

BACKGROUND OF THE INVENTION

Generally, phosphors are classified into white, red, green, yellow and blue phosphors, and among them, red(R), green (G) and blue(B) phosphors are mainly used for display devices such as CRT.

Red phosphor is produced by firing raw materials of the red phosphor, washing the resulting fired material, ball-milling the washed material, coating the material with pigments, drying and then sieving the material.

Green and blue phosphors are produced by firing raw materials, washing the resulting fired material, ball-milling the washed material, surface-treating with various silicate compounds and then sieving the material. That is, in the conventional phosphor producing method, the ball-milling process is indispensably carried out to reduce the amount of aggregated particles and to disperse the phosphor materials. However, there is a problem in that the brightness of the phosphor seriously decreases during the ball-milling process.

SUMMARY OF THE INVENTION

It is an object of the present invention to provide a method of producing phosphor of high brightness, which carries out the ball-milling process during a reduced time interval. In order to achieve this and other objects, the method of producing phosphor of high brightness includes the steps of firing raw materials, washing the resulting fired material, ball-milling the washed material with one or more dispersion agents, coating the ball-milled material with pigments and drying the coated material.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
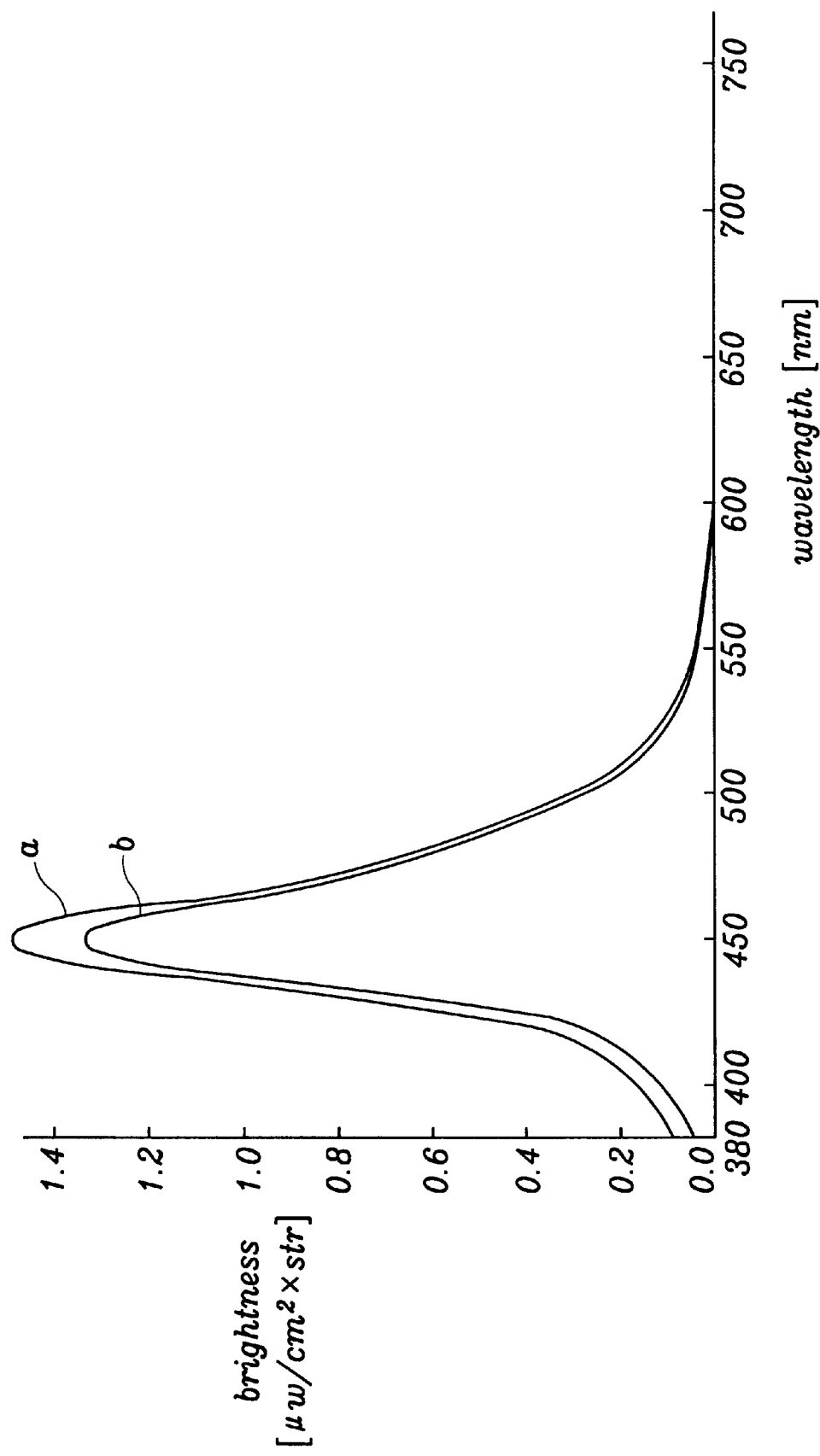
FIG. 1 is a graph showing the light emitting spectrums of phosphors produced by an embodiment of the present invention and by a comparative example.

For a better understanding of the present invention, reference will now be made in detail to the following disclosures and appended claims.

In the method of producing phosphor of high brightness according to the present invention, the raw materials of the phosphor are first fired and washed with distilled water. Then, the washed material is ball-milled with one or more dispersion agents, and the ball-milled material is coated with pigment and finally dried. The dispersion agents can be added to the washed phosphor material before or during the ball-milling process.

In the present invention, the dispersion agent is preferably selected from the group consisting of silicate compounds, sodium polycarbonate, and alcohols. One example of a silicate compound is ethyl silicate, and all kinds of alcohols can be used as the dispersion agent. The dispersion agent is preferably a mixture of a silicate compound of 1–10 vol % and an alcohol of 90–99 vol %. Generally, 0.5–5 ml of the dispersion agent is used for dispersing 100 g of the washed phosphor material. However, the amount of the dispersion agent can be variously modified according to the dispersion conditions.

The ball-milling process can be preferably carried out for 3 to 60 minutes to prevent the reduction in brightness of the phosphor. The ball-milling process is carried out to reduce the amount of aggregated particles and to disperse the phosphor materials, and indispensable in producing the phosphor. Since the brightness of the phosphor decreases because the phosphor material is destroyed during the ball milling process, the duration of the ball-milling process should be reduced. In the present invention, by adding one or more dispersion agents during or before the ball-milling process of the washed phosphor material, the ball-milling process can be completed in 3 to 60 minutes compared to the conventional ball-milling time of 5 to 6 hours. Thus, the reduction in brightness can be prevented.

In order to more fully illustrate the preferred embodiments of the present invention, the following detailed examples are given.

EXAMPLE 1

ZnS, $AgNO_3$, NaCl, $MgCl_2 \bullet 6H_2O$ and S are mixed and fired at 950° C. under an $N_2$ atmosphere to produce a blue phosphor, and then the fired material is washed with distilled water. With ethyl silicate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a blue phosphor having high brightness.

EXAMPLE 2

ZnS, $AgNO_3$, NaCl, $MgCl_2 \bullet 6H_2O$ and S are mixed and fired at 950° C. under an $N_2$ atmosphere to produce a blue phosphor, and then the fired material is washed with distilled water. With sodium polycarbonate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a blue phosphor having high brightness.

EXAMPLE 3

ZnS, $AgNO_3$, NaCl, $MgCl_2 \bullet 6H_2O$ and S are mixed and fired at 950° C. under an $N_2$ atmosphere to produce a blue phosphor, and then the fired material is washed with distilled water. With ethyl alcohol added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a blue phosphor having high brightness.

EXAMPLE 4

$Y_2O_3$, $Eu_2O_3$, S, $Na_2CO_3$ and $K_2PO_4$ are mixed and fired at 1250° C. under an $N_2$ atmosphere to produce a red phosphor, and then the fired material is washed with distilled water. With ethyl silicate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a red phosphor having high brightness.

EXAMPLE 5

$Y_2O_3$, $Eu_2O_3$, S, $Na_2CO_3$ and $K_2PO_4$ are mixed and fired at 1250° C. under an $N_2$ atmosphere to produce a red phosphor, and then the fired material is washed with distilled water. With sodium polycarbonate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a red phosphor having high brightness.

EXAMPLE 6

$Y_2O_3$, $Eu_2O_3$, S, $Na_2CO_3$ and $K_2PO_4$ are mixed and fired at 1250° C. under an $N_2$ atmosphere to produce a red phosphor, and then the fired material is washed with distilled water. With ethyl alcohol added as a dispersion agent, the washed material is ball-milled during 30 minutes. Thereafter, the ball-milled material is coated with a pigment, and then dried at 15° C. The residual aggregated particles and other large particles in the dried material are eliminated by a sieving process to produce a red phosphor having high brightness.

EXAMPLE 7

ZnS, Au, Cu and Al are mixed and fired at 950° C. under a $CS_2$ and $H_2S$ atmosphere to produce a green phosphor, and then the fired material is washed with distilled water. With ethyl silicate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a green phosphor having high brightness.

EXAMPLE 8

ZnS, Au, Cu and Al are mixed and fired at 950° C. under a $CS_2$ and $H_2S$ atmosphere to produce a green phosphor, and then the fired material is washed with distilled water. With sodium polycarbonate added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a green phosphor having high brightness.

EXAMPLE 9

ZnS, Au, Cu and Al are mixed and fired at 950° C. under a $CS_2$ and $H_2S$ atmosphere to produce a green phosphor, and then the fired material is washed with distilled water. With ethyl alcohol added as a dispersion agent, the washed material is ball-milled for 30 minutes. Thereafter, the ball-milled material is coated with a pigment, and then dried at 15° C. The residual aggregated particles and other large particles in the dried material are eliminated by a sieving process to produce a green phosphor having high brightness.

Comparative Example 1

ZnS, $AgNO_3$, NaCl, $MgCl_2 \bullet 6H_2O$ and S are mixed and fired at 950° C. under an $N_2$ atmosphere to produce a blue phosphor, and then the fired material is washed with distilled water. The washed material is ball-milled for 6 hours. Thereafter, the ball-milled material is coated with a pigment, and then dried at 100° C. The residual aggregated particles and other large particles in the dried material are eliminated by a sieving process to produce a blue phosphor.

Comparative Example 2

$Y_2O_3$, $Eu_2O_3$, S, $Na_2CO_3$ and $K_2PO_4$ are mixed and fired at 1250° C. under an $N_2$ atmosphere to produce a red phosphor, and then the fired material is washed with distilled water. The washed material is ball-milled for 6 hours. Thereafter, the ball-milled material is coated with a pigment, and then dried at 100° C. The residual aggregated particles and other large particles in the dried material are eliminated by a sieving process to produce a red phosphor.

Comparative Example 3

ZnS, Au, Cu and Al are mixed and fired at 950° C. under a $CS_2$ and $H_2S$ atmosphere to produce a green phosphor, and then the fired material is washed with distilled water. The washed material is ball-milled for 6 hours. Thereafter, the ball-milled material is coated with a pigment, and then dried at 100° C. The residual aggregated particles and other large particles in the dried material are eliminated by a sieving process to produce a green phosphor.

The light emitting spectrums of phosphors produced by Example 1 and Comparative Example 1 are shown in FIG. 1. In FIG. 1, the reference characters "a" and "b" represent the light emitting spectrums of phosphors produced by Example 1 and Comparative Example 1, respectively. As shown in FIG. 1, the brightness of the phosphor according to Example 1 is more intense than that of the phosphor according to Comparative Example 1. Other Examples show an increase in brightness similar to Example 1.

As described above, the time for the ball-milling process can be reduced from 5 to 6 hours to 3 to 60 minutes by adding a dispersion agent during or before the ball-milling process of the phosphor material. Therefore, the reduction in brightness due to the ball-milling process can be prevented, and the brightness of the phosphor according to the present invention increases by 7–10% compared to that of the conventional phosphor.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of producing a phosphor of high brightness comprising the steps of:
   firing raw materials of the phosphor;
   washing the resulting fired material;
   adding sodium polycarbonate as a dispersion agent to the washed material;
   ball-milling the washed material;
   coating the ball-milled material with pigment; and
   drying the coated material.

2. The method of claim 1, wherein the ball-milling step is carried out for 3 to 60 minutes.

3. The method of claim 1, wherein the dispersion agent is added before the ball-milling step.

4. The method of claim 1, wherein the dispersion agent is added during the ball-milling step.

* * * * *